United States Patent [19]

Ahmed

[11] 3,867,685

[45] Feb. 18, 1975

[54] FRACTIONAL CURRENT SUPPLY

[75] Inventor: Adel Abdel Aziz Ahmed, Annandale, N.J.

[73] Assignee: RCA Corporation, New York, N.Y.

[22] Filed: June 1, 1973

[21] Appl. No.: 365,833

[52] U.S. Cl. .......................... 323/4, 323/40, 330/22

[51] Int. Cl. .......................... G05f 3/08

[58] Field of Search ........ 307/296, 297, 321; 323/1, 323/4, 40, 75 F; 328/160; 330/22, 30 D, 38 M, 40

[56] References Cited

UNITED STATES PATENTS

| | | | |
|---|---|---|---|
| 3,271,660 | 9/1966 | Hilbiber | 323/75 F |
| 3,551,836 | 12/1970 | Greeson | 323/1 UX |
| 3,622,897 | 11/1971 | Tsugita | 330/40 X |
| 3,689,752 | 9/1972 | Gilbert | 328/160 |

*Primary Examiner*—A. D. Pellinen

*Attorney, Agent, or Firm*—H. Christoffersen; S. Cohen; A. L. Limberg

[57] ABSTRACT

A relatively small value of current is obtained in an integrated circuit by separating a larger current into two or more parts. The circuit includes two transistors and at least two strings of the same number of series connected diodes. Currents in a fixed ratio to one another are applied in the forward direction to the two strings of diodes and the voltages thereby obtained are applied to the respective base electrodes of the transistors. The larger current is applied in parallel to the emitter-to-collector paths of the two transistors and that part of this current which passes through the one of the transistors drawing the smaller of the two currents, is the current of interest.

19 Claims, 7 Drawing Figures

FRACTIONAL CURRENT SUPPLY

The present invention relates to circuitry for providing a supply of current which is relatively small with respect to the resistances used in that circuitry.

In the design of monolithic integrated circuitry employing bipolar transistors, it is desirable to avoid the use of resistors having resistances of more than a few kilohms, particularly where it is necessary to define the tolerances on those resistances to be less than ±20% or ±30% of their value. Larger resistance, more accurate resistors take up excessive area on the integrated circuit die. This makes it difficult to define low current in the range of a few microamperes or less in the integrated circuitry.

The base current of a transistor with regulated collector or emitter current can be used as a source of small currents. However, this base current varies with temperature and process variations and such changes in the current level make it unsuitable for many purposes.

The offset potential of a forward-biased diode can be applied to the series combination of the base-emitter junction of a transistor and an emitter degeneration resistor, causing the transistor to have only a small collector current. This circuit also displays variation in its supplied current as a function of temperature change, which is often undesirable.

In various embodiments of the present invention, small output current, which is proportional to a much larger supplied current, is obtained by separating the supplied current into larger (and smaller) fractions which are in a fixed ratio to one another. That is, the supplied current is fractionalized to provide a small current component therefrom. The current to be fractionalized is provided by a supply exhibiting a current supplying characteristic with temperature change, which is the same as that desired for the small current. For instance, this current provided by the supply may be temperature independent.

IN THE DRAWING

FIGS. 1 through 7 are schematic diagrams of various embodiments of the present invention in which:

FIG. 1 shows unequal currents $I_F$ and $I_G$ being applied to first ends of serial combinations of diodes connected at their second ends to a reference potential, thereby to develop between those second ends a difference potential applied to the base electrodes of pair of emitter-coupled transistors to control their relative contributions to a current $(I_P + I_Q)$ drawn from their connected emitter electrodes and to reduce the collector current $I_Q$ of the one transistor to a relatively low value;

Figure 1:
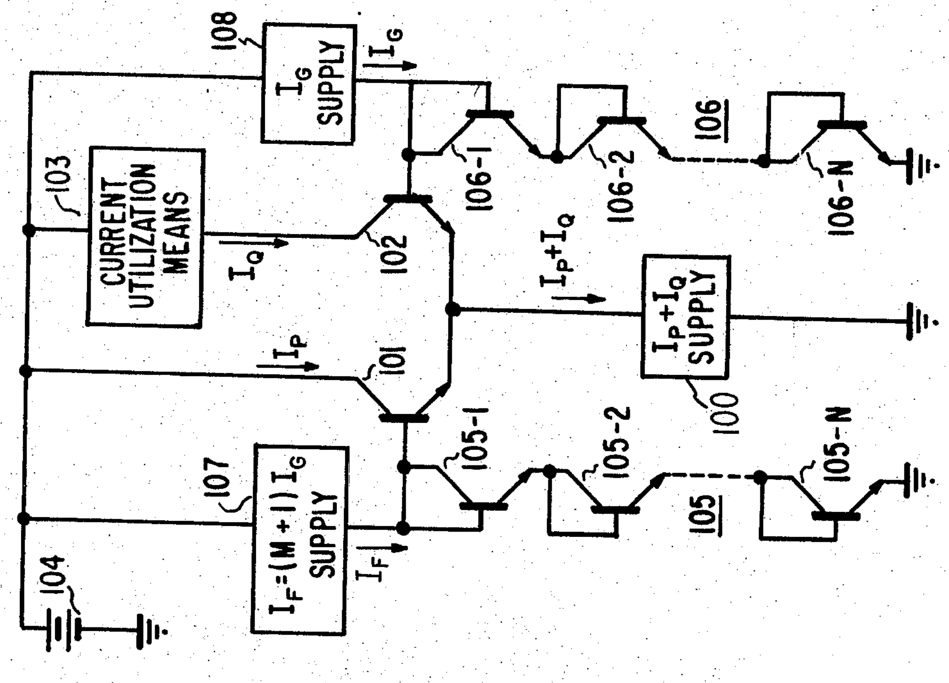
Figure 4:
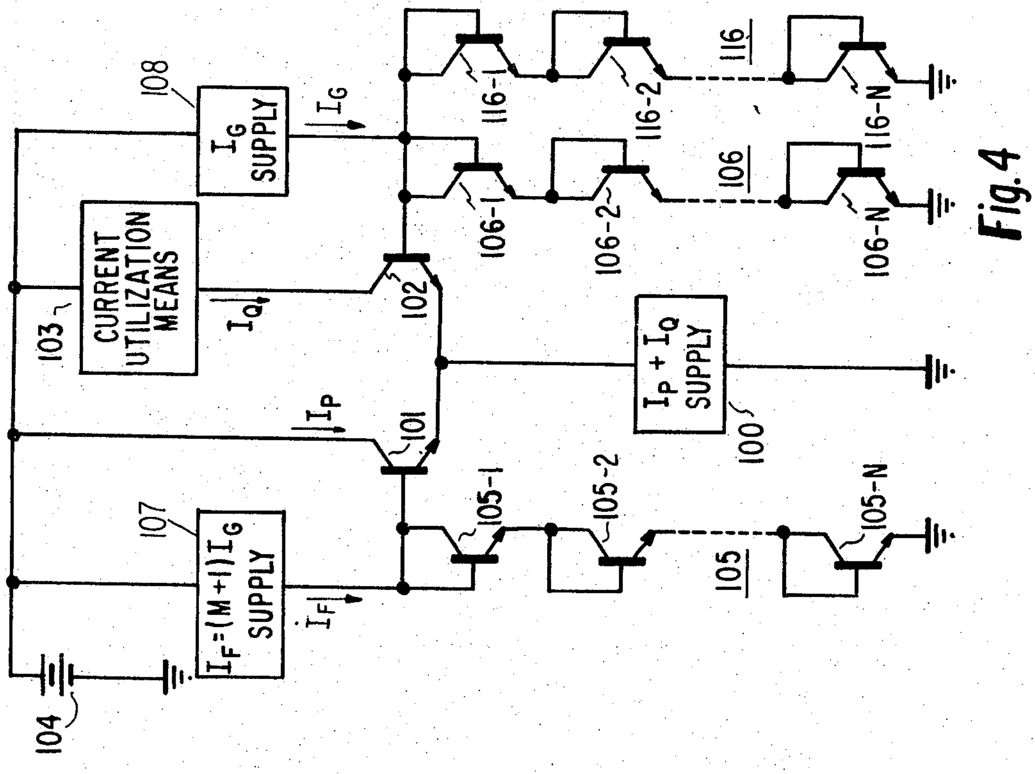
Figure 5:
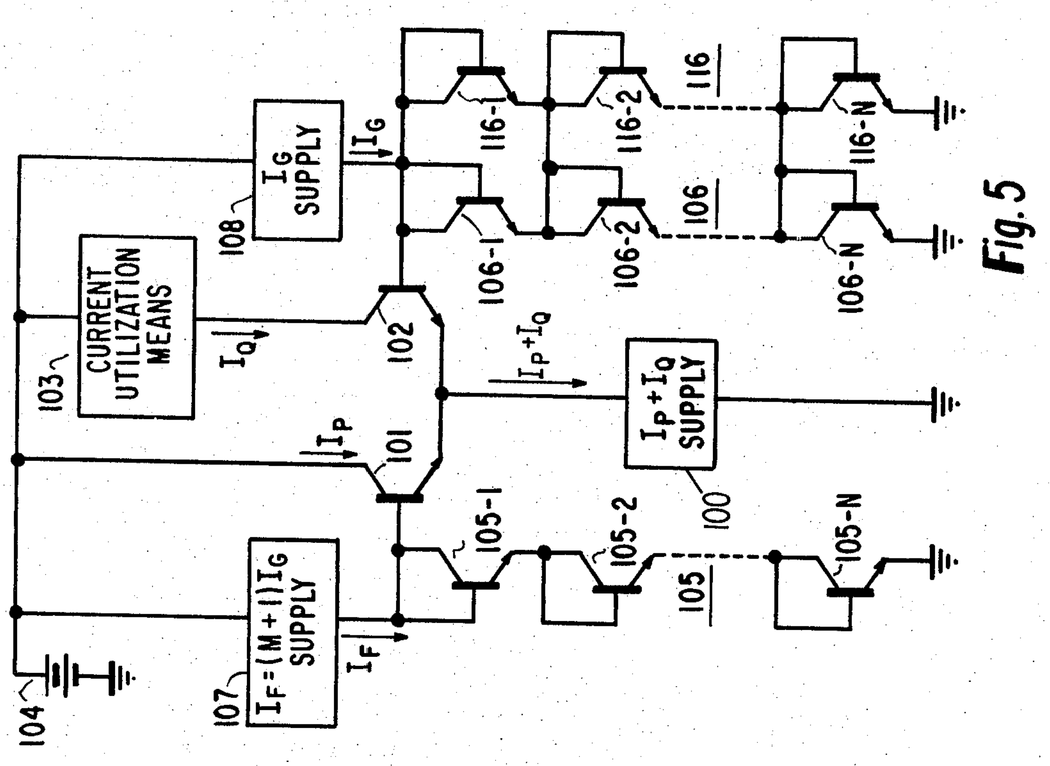
Figure 6:
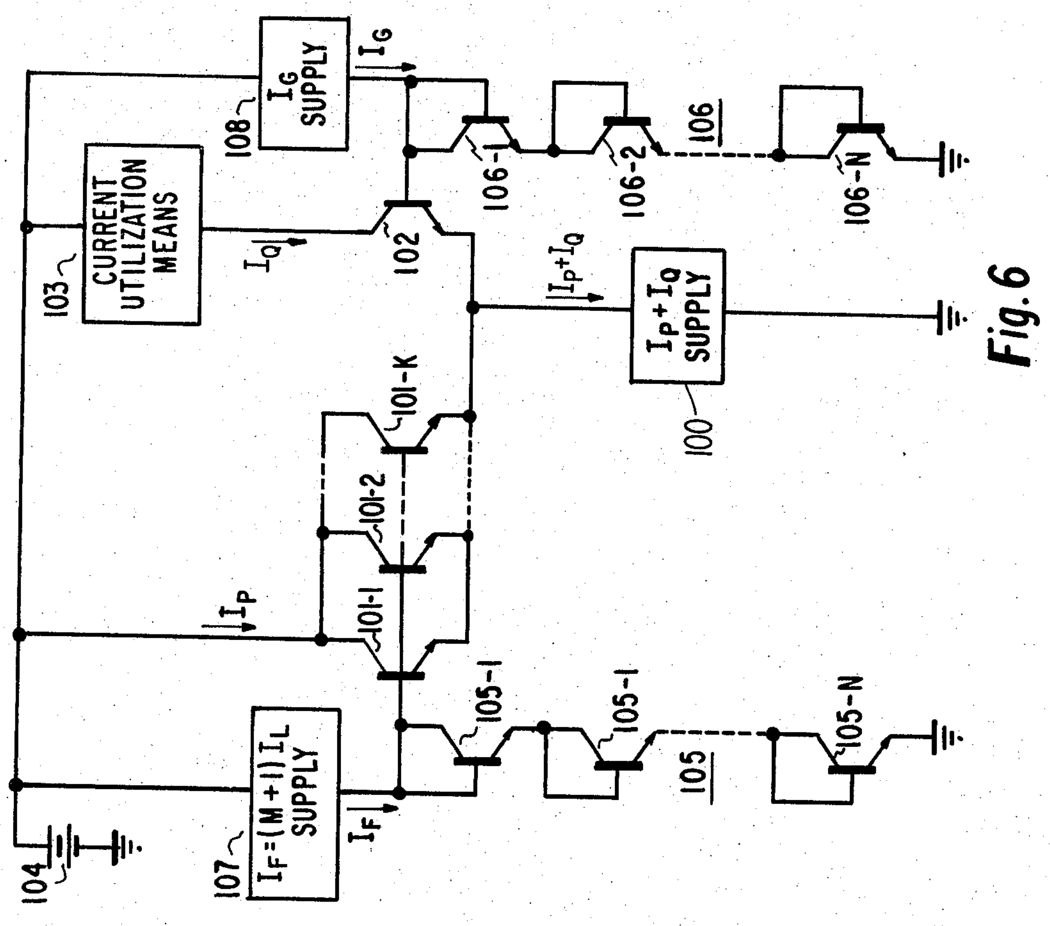
Figure 7:
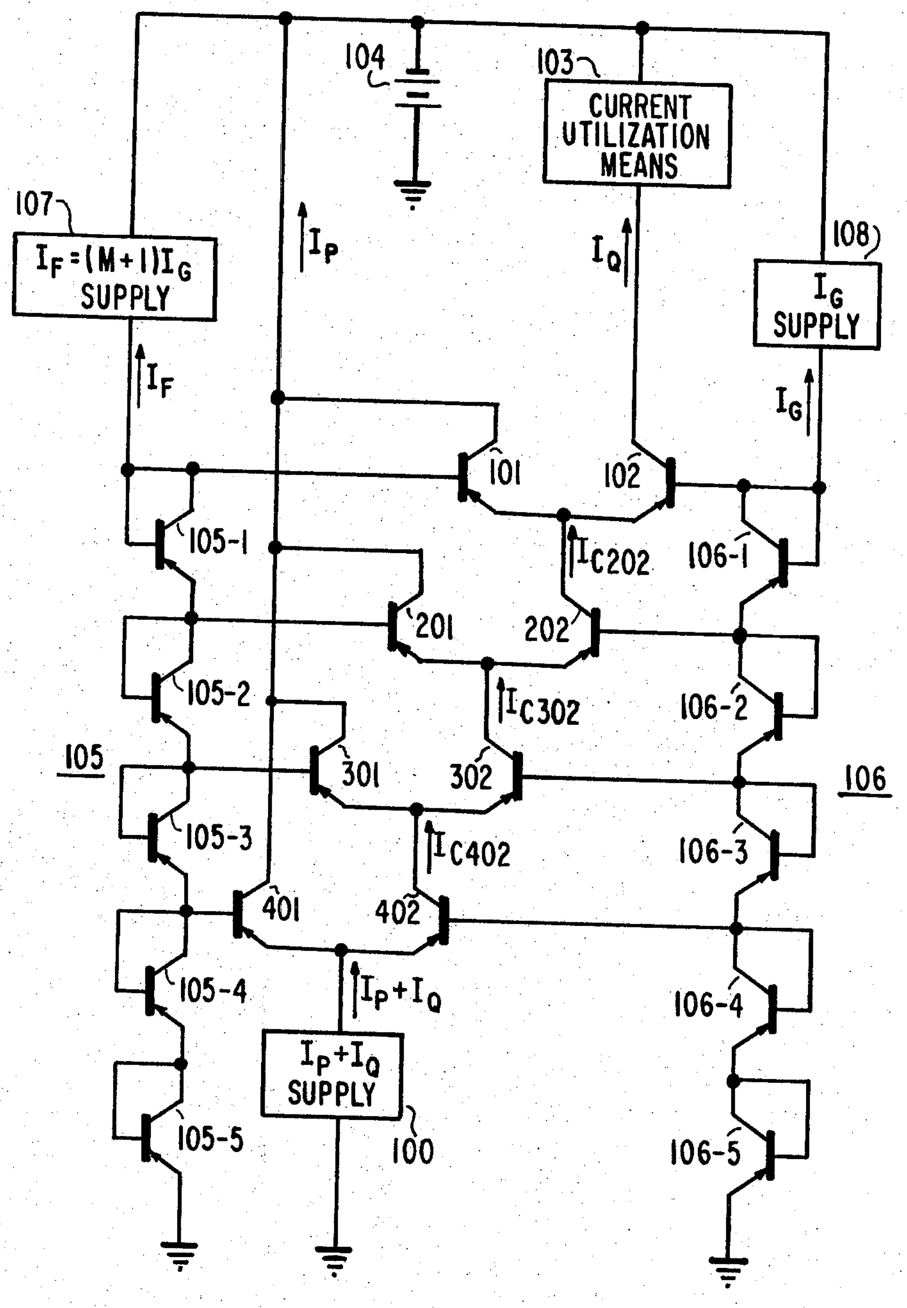

FIG. 4 relates to the parallelling of one of the serial combinations of diodes with another to affect the differential voltage between the electrodes of the emitter-coupled transistors and even to permit the differential voltage to be developed despite $I_F$ and $I_G$ being chosen to be equal;

FIG. 5 illustrates an alternative configuration to the FIG. 4 connection where the parallel connection of serial combinations of diodes is replaced by a serial combination of parallelled diodes;

FIG. 6 relates to the further reduction of current $I_Q$ relative to $I_P + I_Q$ by making the combined effective areas of the base-emitter junctions of the transistors sharing the conduction of $I_P$ larger than the effective area of the base-emitter junction of the transistor conducting $I_Q$; and FIG. 7 shows an $I_P + I_Q$ current being split several times in a cascade of circuits of the type depicted in FIG. 1 and the same pair of serial combinations of diodes being used to develop the differential potentials for each pair of emitter-coupled current splitting transistors.

Referring to FIG. 1, a direct current supply 100 withdraws a current $I_P + I_Q$, which is to be fractionalized, from the interconnected emitter electrodes of transistors 101, 102. As shall be explained in detail, a fractional current $I_Q$ is withdrawn from current utilization means 103 to the collector electrode of transistor 102. Direct potential supply 104 provides a source of reference and operating potentials. The current withdrawn from the current utilization means 103 originates from potential supply 104. The collector electrode of transistor 101 is coupled to potential supply 104 to receive an operating potential and a current $I_P$ flows to its collector.

The base electrode of transistor 101 is connected to ground reference potential by a serial combination 105 comprising N diodes 105-1, 105-2 . . . 105-N. The base electrode of transistor 102 is connected to ground reference potential by a serial combination 106 also comprising N diodes 106-1, 106-2 . . . 106-N. (Diodes 105-1, 105-2 . . . 105-N and 106-1, 106-2 . . . 106-N are all shown as being formed from transistors having their base electrodes connected to their collector electrodes, which is the usual method of forming diodes within monolithic integrated circuitry; but other known means of providing the semiconductor diodes can be employed in the circuits embodying the present invention.) The serial combinations 105 and 106 are supplied currents $I_F$ and $I_G$, respectively, from current supplies 107 and 108, respectively. The current $I_F$, which forward biases the diodes in serial combination 105, is in a predetermined and fixed ratio (M+1):1 with the current $I_G$, which forward biases the diodes in serial combination 106. The number M is positive, so current $I_F$ is always somewhat larger than $I_G$.

It is well known that the offset potential across a semiconductor diode is related to the logarithm of its forward current. For transistors such as the diode-connected transistors in serial combinations 105, 106 the following expression is applicable:

$$V_{BE} = (kt/q)\ \ln\ (I_C/I_S), \qquad (1)$$

where:

$V_{BE}$ is the offset potential between the base and emitter electrodes of the transistor, $k$ is Boltzmann's constant, $T$ is absolute temperature, $q$ is the charge on an electron, $I_C$ is the collector current of the transistor and $I_S$ is the saturation current in the transistor.

$V_{B101}$ and $V_{B102}$, the potentials at the base electrodes of transistors 101 and 102, respectively, can therefore be expressed as:

$V_{B101} = NV_{BE105} = (NkT/q)\ ln\ (I_{C105}/I_S\Psi) = (kT/q)\ ln\ (I_{C105}/I_{S105})^N$ and (2)

$V_{B102} = NV_{BE106} = (NkT/q)\ ln\ (I_{C106}/I_{S106}) = kT/q\ ln\ (I_{C106}/I_{S106})^N$ (3)

The subscripts 105 and 106 refer the parameters to diode-connected transistors within serial combinations 105, 106, respectively, presuming the transistors within each combination to have substantially identical operating characteristics.

The potential appearing between the base electrodes of transistors 102 and 101, $\Delta V$, can be expressed as follows:

$\Delta V = V_{B101} - V_{B102} = (kT/q)\ ln\ (I_{C105}/I_{S105})^N - (kT/q)\ ln\ (I_{C106}/I_{S106})^N = (kT/q)\ [ln\ (I_{C105}/I_{S106})^N + ln\ (I_{S105}/I_{C106})^N]$ (4)

Assuming all of the transistors in serial combinations 105 and 106 to have substantially identical operating characteristics (and this can be a valid assumption in the case of an integrated circuit), $$I_{S105} = I_{S106},\ \text{so} \quad (5)$$

$$I_{S105}/I_{S106} = 1. \quad (6)$$

The lagarithm of 1 raised to any power is equal to zero for any base. Therefore:

$$\Delta V = (kT/q)\ ln\ (I_{C105}/I_{C106})^N \quad (7)$$

Assuming the base currents of transistors 101 and 102 to be negligible compared to the currents flowing in serial combinations 105, 106:

$$I_{C105} = \alpha_{105}\ I_{E105} = \alpha_{105}\ I_F\ \text{and} \quad (8)$$

$$I_{C106} = \alpha_{106}\ I_{E106} = \alpha_{106}\ I_G, \quad (9)$$

where $I_{E105}$ and $I_{E106}$ are the emitter currents of diode-connected transistors in serial combinations 105 and 106, respectively. The common-base forward current gains $\alpha_{105}$ of the transistors in combination 105 and $\alpha_{106}$ of the transistors in combination 106 are substantially equal in any instance, and particularly so since all of the transistors have been presumed to have substantially identical operating characteristics. This fact is used to reduce equation 10, below, which is obtained by substitution of equations 8 and 9 into equation 7, to simpler form.

$\Delta V = (kT/q)\ ln\ (\alpha 105\ I_F/\alpha 106\ I_G)^N = (kT/q)\ ln\ (I_F/I_G)^N$ (10)

Equation 10 expresses the potential $\Delta V$ applied between the base electrode of transistors 102 and 101, which are connected as an emitter-coupled differential amplifier.

Equation 1 may be used to analyze the operation of the differential amplifier formed by transistors 101 and 102, regarding $\Delta V$ as the difference between their respective base-emitter potential offsets $V_{BE101}$ and $V_{BE102}$.

$$V_{BE101} = (kT/q)\ ln\ (I_P/I_{S101}) \quad (11)$$

$$V_{BE102} = (kT/q)\ ln\ (I_Q/I_{S102}) \quad (12)$$

$$\Delta V = V_{BE101} - V_{BE102} \quad (13)$$

$$= (kT/q)\ [ln\ (I_P/I_Q) + ln\ (I_{S101}/I_{S102})] \quad (14)$$

For similar transistors 101 and 102, $I_{S101}$ is substantially equal to $I_{S102}$. Therefore:

$$\Delta V = (kT/q)\ ln\ (I_P/I_Q) \quad (15)$$

Cross-solving equations 10 and 15:

$kT/q\ ln\ (I_P/I_Q) = \Delta V = (kT/q)\ ln\ (I_F/I_G)^N\ ln\ (I_P/I_Q) = ln\ (I_F/I_G)^N \cdot (I_P/I_Q) = (I_F/I_G)^N$ (16)

Solving for $I_Q$ in terms of $(I_P + I_Q)$:

$$I_Q = (I_P + I_Q)/1 + (I_F/I_G)^N \quad (17)$$

Again, equation 17 describes the circuit of FIG. 1 when all of the diode-connected transistors in serial combinations are identically similar.

In a monolithic integrated circuit, it is possible to conveniently and accurately scale currents $I_F$ and $I_G$ by factors between 1:1 and 4:1. As the ratio of $I_F$ to $I_G$ increases beyond 4:1, it becomes more difficult to proportion them accurately. Even though the ratio of $I_F$ to $I_G$ is maintained within the preferred range of values, the ratio of $I_Q$ to $I_P + I_G$ can be made very small indeed if $N$ be made large. Table 1 tabulates $(I_P + I_Q)/I_Q$ for various values of N, the number of diodes in each of the serial conbinations 105 and 106, and of $(L \cdot I_F)/I_G$. L is a constant which for present purposes equals 1.

TABLE 1

| | $(I_P + I_Q)/I_Q$ RATIOS | | | | |
|---|---|---|---|---|---|
| | $LI_F/I_G$ | | | | |
| N | 2:1 | 3:1 | 4:1 | 5:1 | 6:1 |
| 1 | 3 | 4 | 5 | 6 | 7 |
| 2 | 5 | 10 | 17 | 26 | 37 |
| 3 | 9 | 28 | 65 | 126 | 217 |
| 4 | 17 | 82 | 257 | 626 | 1297 |
| 5 | 33 | 244 | 1025 | 3126 | 7777 |
| 6 | 65 | 730 | 4097 | 15626 | 46657 |

As can be seen from the table, substantially decreased current ($I_Q$) can be provided with the addition of only a few-diode-connected transistor elements, each of which takes up very little area on the integrated circuit.

Figure 2:
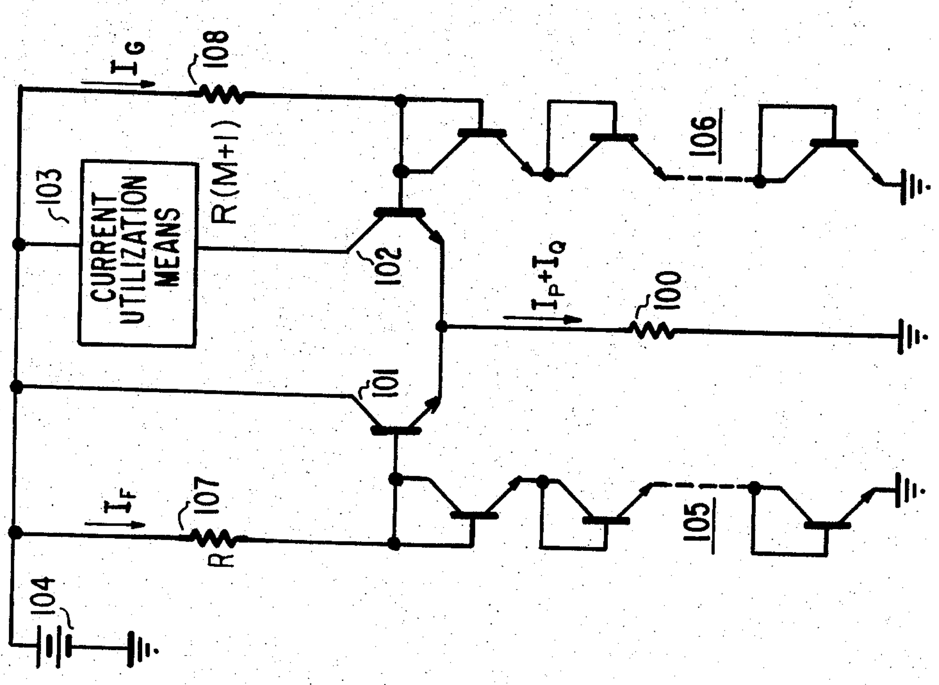
FIG. 2 shows the unequal currents $I_F$ and $I_G$ being developed by means of a pair of dissimilar resistances respectively connecting an operating potential to the first ends of the serial combinations of diodes.

FIG. 2 shows the configuration of FIG. 1 wherein each of the current supplies 100, 107 and 108 comprises a single resistor. The serial combinations 105 and 106 of diodes together with base-emitter junctions of transitors 101 and 102 regulate the potential at the interconnection of the emitter electrodes of transistors 101 and 102 with respect to ground reference potential. Consequently, a resistive network (e.g., resistor 100) connected between this interconnection and ground reference potential will maintain a well-regulated $I_P + I_Q$ flow through itself.

The $\Delta V$ appearing between the base electrodes of transistors 101 and 102 is small compared to the potential drop across resistors 107 and 108, so these potential drops can be considered to be equal to each other. By making the resistance of resistor 108 (M+1) times that of the resistance of resistor 107, $I_F$ current flow through resistor 107 is (M+1) times $I_G$ current flow through resistor 108. The actual values of these currents is not material in determining the proportions of $I_P+I_Q$ flowing as emitter currents $I_P$ and $I_Q$ as seen from equation 16. Rather, the ratio of the currents $I_F$ and $I_G$ is important in this regard. Consequently, whether the potential provided by supply 104 is regulated or varies has substantially no effect upon the determination of $I_P$ and $I_Q$ so long as diodes in the serial combinations 105 and 106 are maintained forward-biased.

Figure 3:
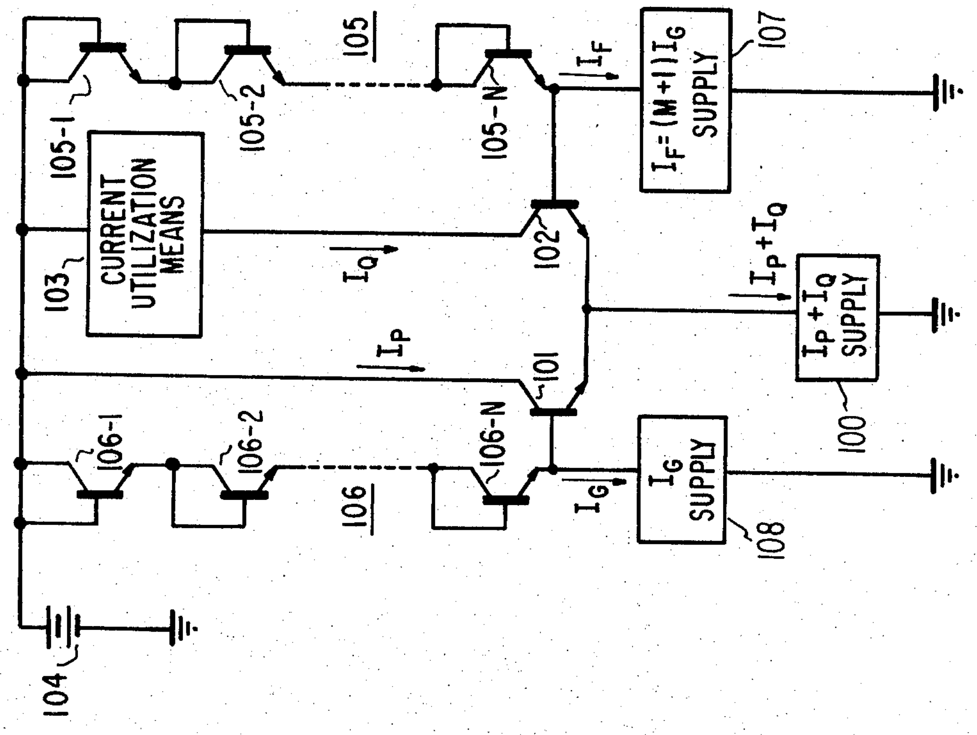
FIG. 3 shows the reference potential being the same polarity with respect to the potential at the interconnected emitter electrodes of the emitter-coupled transistors as the potentials at their base electrodes, rather than of opposite polarity, as in FIG. 2.

As the number $N$ increases to a large number, the base electrodes of transistors 101, 102 may assume quite a high potential. Since the potential available for the current utilization means 103 is the difference between the operating potential provided by direct potential supply 104 and the base potential of transistor 102, this difference may not be large enough to accomodate certain current utilization means 103. The $I_P + I_Q$ supply is commonly afforded from the collector electrode of a grounded-emitter transistor (not shown), which requires little potential between its collector and emitter electrodes in order to operate effectively. Consequently, it may be advantageous to rearrange the circuit of FIG. 1 as shown in FIG. 3 when N becomes large enough that the offset potentials across serial combinations 105 and 106 exceed one-half of the potential supplied by supply 104. In the rearranged circuit, the serial combinations are connected between source 104 and the respective base electrodes rather than between the base electrode and ground. The fractionalizing operation of the circuit is unaffected by this rearrangement.

It should be noted that when the reference potential to which the serial combinations 105 and 106 are referred is more positive than the base potentials of NPN transistors 101 and 102 as shown in FIG. 3, rather than less positive as shown in FIG. 1, the serial combination 105 providing higher current must be coupled to the base electrode of transistor 102 and the serial combination 106 providing lower current must be coupled to the base electrode of transistor 101. This is a reversal of connections to the base electrodes of transistors 101 and 102 as compared with the configuration of FIG. 1. The difference potential $\Delta V$ should be applied to the base electrodes of NPN transistors 101 and 102 so transistor 101 is more conductive than transistor 102—that is, the base of transistor 101 should be more positive than that of transistor 102.

In situations where PNP transistors 101, 102 are used and the polarity of potential supply 104 is reversed, it is still advantageous to use diode-connected NPN transistors in the serial combinations 105 and 106. This is because the NPN devices generally have a vertical structure rather than a lateral structure as PNP devices generally do, and therefore, take up less area on the integrated circuit. Care must be taken to pole the diodes in serial combinations 105, 106 to be forward biased when this is done.

FIG. 4 shows another way to obtain increased available potential for the current utilization means. Parallelling the serial combination 106 with at least one other similar serial combination 116 of N diodes 116-1, 116-2, . . . 116-N, can be used to reduce the number $N$ which is required to achieve a suitably large ratio of $(I_P+I_Q)/I_Q$. This circuit is most easily analyzed by realizing that the current $I_G$ divides equally between the parallel paths presented by the serial combinations 106, 116. If there were L number of paths presented by L number of serial combinations including 106 and 116, the current in each path would be $(I_G/L)$; and the offset potentials across each semiconductor diode in this network would be that characteristic of this current level. Therefore, equation 17 may be modified to obtain the more general expression below:

$$I_Q = (I_P + I_Q)/1 + (L \cdot I_F/I_G)^N \quad (18)$$

Again, Table 1 is appropriate to describe the results obtainable with this circuit.

An advantage of the circuit of FIG. 4 is that $I_F$ need no longer be larger than $I_G$ in order to obtain current fractionalizing. That is, $M$ may take on values from −1 to 0 as well as positive values. $I_F$ need only be larger than $I_G/L$. This permits the currents $I_F$ and $I_G$ to be made equal if $L$ be chosen larger than 1. The supplies 107 and 108 can then be made identically similar on the integrated circuit, which normally permits most accurate proportioning of $I_F$ and $I_G$ with respect to each other.

The potentials at the collectors of transistors **106-*n* and 116-*n*, where $n$ is any number from 1 to $N$, are equal. Therefore, these transistors 106-*n* and 116-*n*** can—if formed as vertical structure diffused transistors—have their base and emitter regions which are not isolated from each other.

As shown in FIG. 5, there can even be ohmic connection between the collector electrodes of transistors **106-*n* and 116-*n*. This will not change the operation of the circuit as compared to that of FIG. 4.**

Now it is known that parallelled transistors can be replaced by a single transistor having an effective base-emitter junction area equal to the sum of the effective base-emitter junction areas of the transistors it replaces. Thus, the operation of the circuit of FIG. 1 when the diodes in serial combination 106 have an effective base-emitter junction area $L$ times as large as that of the diodes in serial combination 105 also is the equivalent of the operation shown in FIG. 4. Again, Table 1 is appropriately descriptive of the results obtainable with such circuits.

(This operation is not contradictory to equation 1 as it might appear to be, for equation 1 properly is an expression derived from a more general equation relating $V_{BE}$ to base-emitter junction current density. $V_{BE}$ is directly proportional to absolute temperature and to the logarithm of base-emitter junction current density, as between different transistors, even if their effective base-emitter junction areas differ. In any given transistor, collector current $I_C$ is directly proportional to base-emitter junction current density.)

Heretofore, transistors 101 and 102 have been assumed to have like geometries and identical operating characteristics. The effective base-emitter junction area of transistor 101 of FIG. 1 may be made larger than that of transistor 102 by a factor $K$. Alternatively, as shown in FIG. 6, transistor 101 may be formed by parallelling a number $K$ of transistors 101-1, 101-2, . . . 101-K, each of which is similar to transistors 102. In either case, the current $I_Q$ will be further fractionalized by the factor $K$ as compared to the case where transistors 101 and 102 are identically similar.

FIG. 7 shows an embodiment of the present invention which can provide greater $(I_P + I_Q)/I_Q$ ratios with fewer devices. This embodiment can alternatively provide greater $(I_P + I_Q)/I_Q$ ratios using a smaller $I_F/I_G$ ratio— which is desirable since generally the more nearly equal $I_F$ and $I_G$ are, the more likely they are to be correctly proportioned. Although NPN devices are generally used to realize circuits using the present invention, PNP devices can be used instead in any of the configurations shown in the figures. PNP transistors are shown in FIG. 7 since it makes the operation of the consecutive current fractionalizing process more apparent.

The current $I_P + I_Q$ is supplied to the joined emitters of transistors 401, 402 and is fractionalized by those transistors to provide a collector current $I_{C402}$ from the collector electrode of transistor 402. From equation 18:

$$I_{C402} = (I_P + I_Q)/1 + (LI_F/I_G)^2 \tag{19}$$

The current $I_{C402}$ is supplied to the joined emitters of transistors 301, 302 and is fractionalized by those transistors to provide a collector current $I_{C302}$ from the collector electrode of transistor 302. Again, using equation 18:

$$I_{C302} = I_{C402}/1 + (LI_F/I_G)^3 \tag{20}$$

The current $I_{C302}$ is supplied to the joined emitter of transistors 201, 202 and is fractionalized by those transistors to provide a collector current $I_{C202}$ from the collector electrode of transistor 202. Again, using equation 18:

$$I_{C202} = I_{C302}/1 + (LI_F/I_G)^4 \tag{21}$$

The current $I_{C202}$ is supplied to the joined emitters of transistors 101, 102 and is fractionalized by those transistors to provide a collector current $I_Q$ from the collector electrode of transistor 102. Again, using equation 18:

$$I_Q = I_{C202}/1 + (LI_F/I_G)^5 \tag{22}$$

Combining equations 19–20, the result of the cascaded fractionalizing process is found to be as follows:

$$I_P = I_P + I_Q/[1+(LI_F/I_G)^5][1+(LI_F/I_G)^4][1+(LI_F/I_G)^3][1+(LI_F/I_G)^2] \tag{23}$$

Since $(LI_F/IG)^N$ for $N$ greater than 1 is larger than 1, to fairly good approximation:

$$I_Q = (I_P + I_Q)/(LI_F/I_G)^{14} \tag{24}$$

This result would obtain for the circuit of FIG. 1 only if $N$ equaled 14, and in such instance the circuit of FIG. 1 would use 30 devices. It might not be feasible to construct such a circuit since the potential offset across 14 diodes in each serial combination 105, 106 would be about 10 volts which approaches or exceeds permissible operating potentials for many integrated circuits. The circuit of FIG. 7, on the other hand, only requires 18 devices. The potential across 5 diodes in the serial combinations 105, 106 is about 3.5 volts—well within the operating potential used for most integrated circuits.

Analyzing equations 19–23, the current fractionalization contributed by each of the successive current splitting stages after 401, 402—301, 302; 201, 202; and 101, 102—is greater than that of its predecessor. Therefore, to get reduced current fractions and at the same time minimize the number of devices used, current splitting stages closer to the current supply 100 should be eliminated first. Following procedures similar to those set forth in connection with equations 19–23, tables of obtainable $I_P + I_Q/I_Q$ for given $LI_F/I_G$ and number of current splitting stages can be developed. Some examples are shown in Tables 2–4, below. Values entered in the tables entered as "VERY LARGE" are so large it may be impracticable to actually realize them, because of leakage effects.

TABLE 2

MAXIMUM $(I_P + I_Q)/I_Q$ RATIO, $LI_F/I_G = 2$

| N | NUMBER OF FRACTIONALIZING STEPS 1 | 2 | 3 | 4 | 5 |
|---|---|---|---|---|---|
| 1 | 3 | | | | |
| 2 | 5 | 15 | | | |
| 3 | 9 | 45 | 135 | | |
| 4 | 17 | 153 | 765 | 2295 | |
| 5 | 33 | 561 | 5049 | 25245 | 75735 |
| 6 | 65 | 2145 | 36465 | 328185 | 1640925 |

TABLE 3

MAXIMUM $(I_P + I_Q/I_Q$ RATIO, $LI_F/I_G = 3$

| N | NUMBER OF FRACTIONALIZING STEPS 1 | 2 | 3 | 4 |
|---|---|---|---|---|
| 1 | 4 | | | |
| 2 | 10 | 40 | | |
| 3 | 28 | 280 | 920 | |
| 4 | 82 | 2296 | 22960 | 75440 |
| 5 | 244 | 20008 | 560224 | 5602240 |
| 6 | 730 | 178120 | 14605840 | VERY LARGE |

TABLE 4

MAXIMUM $(I_P + I_Q)/I_Q$ RATIO, $LI_F/I_G = 3$

| N | NUMBER OF FRACTIONALIZING STEPS 1 | 2 | 3 |
|---|---|---|---|
| 1 | 5 | | |
| 2 | 17 | 85 | |
| 3 | 65 | 1105 | 5525 |
| 4 | 257 | 16705 | 283985 |
| 5 | 1025 | 263425 | 17122625 |
| 6 | 4097 | 4199425 | VERY LARGE |

Various permutations and combinations of the invention described in connection with the circuits of FIGS. 1–7 are possible and feasible. For example, the circuits of FIGS. 4, 5, 6 and 7 can be rearranged in the manner illustrated in FIG. 3.

What is claimed is:

1. A fractional current supply having:

supply means for supplying an operating potential between first and second terminals thereof, one of which terminals provides a common point of interconnection;

a first and a second transistors, each having a base electrode and an emitter electrode with a base-emitter junction therebetween and each having a collector electrode, said emitter electrodes being joined to each other by direct connection;

means for supplying a first current connected between the first terminal of said supply means and said direct connection of the emitter electrodes of said first and said second transistors, poled to forward-bias the base-emitter junctions of said first and said second transistors;

means for direct current conductively coupling the collector electrode of said first transistor to the second terminal of said supply means;

utilization means for a fractional current, said utilization means included in direct current conductively coupling of the collector electrode of said second transistor to the second terminal of said supply means, said fractional current comprising the collector current of said second transistor;

a first serial combination of N diodes, connected between said first transistor base electrode and said common point of interconnection, where N is an integer greater than one;

a second serial combination of N diodes, connected between said second transistor base electrode and said common point of interconnection;

means for applying a second current to said first serial combination of diodes in the forward direction; and means for applying a third current to said second serial combination of diodes in the forward direction, which third current is in continually fixed proportion to said second current, said proportion being chosen to maintain a larger forward bias potential across the base-emitter junction of said first transistor than across the base-emitter junction of said second transistor.

2. A fractional current supply as claimed in claim 1 wherein:

each of the N diodes in said first serial combination has the same effective forward-biased junction area as each other;

each of the N diodes in said second serial combination has the same effective forward-biased junction area as each other and the effective forward-biased junction area of the N diodes in said first serial combination differs from the effective forward-biased junction areas of the N diodes in said second serial combination.

3. A fractional current supply as claimed in claim 2 wherein:

said means for supplying a second and a third currents includes substantially identical means for producing said second current and means for producing said third current, thereby maintaining said second and said third currents in substantially one-to-one proportion.

4. A fractional current supply as claimed in claim 2 wherein:

said first transistor has an effective base-emitter junction area larger than that of said second transistor.

5. A fractional current supply as claimed in claim 2 wherein:

said first transistor has at least one other transistor connected in parallel therewith.

6. A fractional current supply as claimed in claim 1 wherein:

at least one additional serial combination of diodes N in number is connected in parallel with said second serial combination of diodes.

7. A fractional current supply as claimed in claim 6 wherein:

said means for supplying a second and a third currents includes substantially identical means for producing said second current and means for producing said third current thereby maintaining said second and said third currents in substantially one-to-one proportion.

8. A fractional current supply as claimed in claim 6 wherein:

said first transistor has an effective-base emitter junction area larger than that of said second transistor.

9. A fractional current supply as claimed in claim 6 wherein:

said first transistor has at least one other transistor connected in parallel therewith.

10. A fractional current supply as claimed in claim 1 wherein:

each of the N diodes in said second serial combination has at least one other diode connected in parallel therewith.

11. A fractional current supply as claimed in claim 1 wherein said means for supplying a second current and a third current in fixed porportion therewith comprises:

a first and a second resistive elements having conductances in said fixed proportion, said first resistive element being in series combination with said first serial combination, said second resistive element being in series connection with said second serial combination; and means for connecting said first and said second series connections in parallel combination and for applying said reference and operating potential, to said parallel combination from said means for supplying potentials.

12. A fractional current supply comprising:

means for supplying an operating potential and a reference potential;

means for supplying as referred to said reference potential a first bias potential m times as large as the offset potential across a forward biased semiconductor junction operated at a first current density, where m is greater than one;

means for supplying as referred to said reference potential a second bias potential m times as large as the offset potential across a forward biased semiconductor junction operated at a second current density lower than and in continually fixed proportion with said first current density, said first bias potential thereby being larger than said second bias potential as a linear function of absolute temperature;

first and second transistors having base electrodes respectively connected to receive said first and said second bias potentials, having emitter electrodes joined to each other by direct connection, and having collector electrodes;

a current supply means connected between said reference potential and said direct connection of the emitter electrodes of said first and said second transistors;

means for direct current conductively coupling the collector electrode of said first transistor to said operating potential; and means for direct current coupling the collector electrode of said second transistor to said operating potential and for utilizing said fractional current, which flows as the collector current of said second transistor.

13. A fractional current supply as claimed in claim 2 wherein said means for supplying a current which is to be fractionalized comprises:

resistive means connecting the interconnected emitter electrodes of said first and said second transistors to said reference potential.

14. In combination:

first and second terminals respectively for receiving a reference potential and for receiving an operating potential;

first and second transistors, each having a base electrode, a collector electrode and an emitter electrode, connected at their emitter electrodes;

N series-connected first diodes connected between said first terminal and the base electrode of the first transistor, N being an integer greater than one;

N series-connected second diodes connected between said first terminal and the base electrode of the second transistor;

a current supply connected to the emitter electrodes of said transistors for supplying a current to be fractionalized;

a second current supply connected to the base electrode of the first transistor for supplying current in the forward direction to the series-connected first diodes;

a third current supply, providing current which continually is smaller than and in a fixed proportion to said second current, connected to the base electrode of the second transistor for supplying current in the forward direction to the series-connected second diodes;

a connection from the collector electrode of the first transistor to said second terminal; and a fractional current utilization circuit connected between the collector electrode of the second transistor and said second terminal.

15. A fractional current supply including:

means for supplying a first, a second, and a third currents;

a first pair of transistors, the first and the second of which each have an emitter and a base and a collector electrodes, their said emitter electrodes being interconnected with each other and connected to receive said first current;

at least one subsequent pair of transistors, the first and the second of which each have an emitter and a base and a collector electrodes, their said emitter electrodes being interconnected with each other and connected to the collector electrode of the second transistor of said precedent pair;

a separate diode connecting the base electrode of said first transistor of each subsequent pair to the base electrode of the first transistor of the precedent pair and being arranged to be forward biased by passage therethrough of said second current;

a separate diode connecting the base electrode of said second transistor of each subsequent pair to the base electrode of the second transistor of the precedent pair and being arranged to be forward biased by passage therethrough of said third current;

means for referring the base electrodes of said first and second transistors of one of said pairs to a common reference potential; and means for direct current conductively coupling the collector electrodes of said first and said second transistors of each said pair to said means for supplying said currents, which means includes utilization means for the fractional current provided at the collector electrode of said second transistor of the last of said subsequent pairs in response to said first current.

16. A fractional current supply as claimed in claim 15 wherein said means for referring the base electrodes of said first and second transistors of one of said pairs to a common reference potential comprises:

a first and a second pluralities of diodes, each of which pluralities contains a like number of diodes as the other, said first plurality of diodes serially connected from the base electrode of said first transistor of said first pair to said common reference potential and arranged to be forward biased by said second current, and said second plurality of diodes serially connected from the base electrode of said second transistor of said first pair to said common reference potential and arranged to be forward biased by said third current.

17. A fractional current supply comprising:

means for supplying a reference potential and another potential;

means for supplying as referred to said reference potential a first bias potential m times as large as the offset potential across a forward-biased semiconductor junction operated at a first current density, where m is greater than one;

means for supplying as referred to said reference potential a second bias potential m times as large as the offset potential across a forward-biased semiconductor junction operated at a second current density lower than and in continually fixed proportion to said first current density, said first bias potential thereby being larger than said second bias potential as a linear function of absolute temperature;

first and second transistors having base electrodes respectively connected to receive said second and first bias potentials, having joined emitter electrodes, and having collector electrodes;

current supply means connected between said other potential and said joined emitter electrodes;

means for direct current conductively coupling the collector electrode of said first transistor to said reference potential; and means for direct current coupling the collector electrode of said second transistor to said reference potential and for utilizing said fractional current, which flows as the collector current of said second transistor.

18. In combination:

a reference terminal for receiving a reference voltage;

first and second transistors, each having a base electrode, a collector electrode and an emitter electrode, connected at their emitter electrodes;

N series-connected first diodes connected between said reference terminal and the base electrode of the first transistor, N being an integer greater than one;

N series-connected second diodes connected between said reference terminal and the base electrode of said second transistor;

a current supply connected to the emitter electrodes of said transistors for supplying a current to be fractionalized;

a second current supply connected to the base electrode of the first transistor for supplying current in the forward direction to the series-connected first diodes;

a third current supply, providing current which continually is larger than and in a fixed proportion to said second current, connected to the base electrode of the second transistor for supplying current in the forward direction to the series-connected second diodes;

a connection from the collector electrode of the first transistor to said reference terminal; and a fractional current utilization circuit connected between the collector electrode of the second transistor and said reference terminal.

19. In combination:

two transistors, each having base, emitter and collector electrodes joined at their emitter electrodes;

two terminals for operating voltages, one direct current connected to the collector electrodes and the other direct current connected to the joined emitter electrodes;

means coupled to both base electrodes for establishing a difference in quiescent potential $\Delta V$ other than zero between the base electrodes which is linearly proportional to the absolute temperature of said transistors; and fractional current utilization means in the connection between the one of the collector electrodes carrying the smaller collector current and said one terminal.

* * * * *

UNITED STATES PATENT OFFICE
CERTIFICATE OF CORRECTION

PATENT NO. : 3,867,685

DATED : February 18, 1975

INVENTOR(S) : Adel Abdel Aziz Ahmed

It is certified that error appears in the above-identified patent and that said Letters Patent are hereby corrected as shown below:

Column 1, line 13, "current" should read --currents--.
Column 2, equation (1), should read $$V_{BE} = (kT/q) \ln (I_C/I_S) \quad (1)$$

Column 3, equation (2), should read $$V_{B101} = NV_{BE105} = (NkT/q) \ln (I_{C105}/I_{S105})$$
$$= (kT/q) \ln (I_{C105}/I_{S105})^N \quad \text{and} \quad (2)$$

Column 3, equation (3), should read $$V_{B102} = NV_{BE106} = (NkT/q) \ln (I_{C106}/I_{S106})$$
$$= (kT/q) \ln (I_{C106}/I_{S106})^N \quad (3)$$

Column 3, equation (4), should read $$\Delta V = V_{B101} - V_{B102}$$
$$= (kT/q) \ln (I_{C105}/I_{S105})^N - (kT/q) \ln (I_{C106}/I_{S106})^N$$
$$= (kT/q) [\ln (I_{C105}/I_{C106})^N + \ln (I_{S105}/I_{S106})^N] \quad (4)$$

Column 3, line 32, "lagarithm" should read --logarithm--.
Column 3, equation (7), should read $$\Delta V = (kT/q) \ln (I_{C105}/I_{C106})^N \quad (7)$$

Column 3, equation (10), should read $$\Delta V = (kT/q) \ln (\alpha 105\ I_F/\alpha 106\ I_G)^N$$
$$= (kT/q) \ln (I_F/I_G)^N \quad (10)$$

UNITED STATES PATENT OFFICE

CERTIFICATE OF CORRECTION

PATENT NO. : 3,867,685

DATED : February 18, 1975

INVENTOR(S) : Adel Abdel Aziz Ahmed

It is certified that error appears in the above-identified patent and that said Letters Patent are hereby corrected as shown below:

Column 4, equation (11), should read $$V_{BE101} = (kT/q) \ln (I_P/I_{S101}) \quad (11)$$

Column 4, equation (12), should read $$V_{BE102} = (kT/q) \ln (I_Q/I_{S102}) \quad (12)$$

Column 4, equation (14), should read $$= (kT/q) \ [\ln(I_P/I_Q) + \ln(I_{S101}/I_{S102})] \quad (14)$$

Column 4, equation (15), should read $$\Delta V = (kT/q) \ln(I_P/I_Q) \quad (15)$$

Column 4, equation (16) and the two equations preceding it should read as follows $$kT/q \ln(I_P/I_Q) = \Delta V = (kT/q) \ln (I_F/I_G)^N$$

$$\ln(I_P/I_Q) = \ln(I_F/I_G)^N$$

$$(I_P/I_Q) = (I_F/I_G)^N \quad (16)$$

Column 4, equation (17), should read $$I_Q = (I_P + I_Q)/[1 + (I_F/I_G)^N] \quad (17)$$

Column 6, equation (18), should read $$I_Q = (I_P + I_Q)/[1 + (L \cdot I_F/I_G)^N] \quad (18)$$

Column 7, line 8, "transistors" should read --transistor--.

UNITED STATES PATENT OFFICE
CERTIFICATE OF CORRECTION

PATENT NO. : 3,867,685

DATED : February 18, 1975

INVENTOR(S) : Adel Abdel Aziz Ahmed

It is certified that error appears in the above-identified patent and that said Letters Patent are hereby corrected as shown below:

Column 7, equation (19), should read $$I_{C402} = (I_P + I_Q)/[1 + (LI_F/I_G)^2] \quad (19)$$

Column 7, equation (20), should read $$I_{C302} = I_{C402}/[1 + (LI_F/I_G)^3] \quad (20)$$

Column 7, equation (21), should read $$I_{C202} = I_{C302}/[1 + (LI_F/I_G)^4] \quad (21)$$

Column 7, equation (22), should read $$I_Q = I_{C202}/[1 + (LI_F/I_G)^5] \quad (22)$$

Column 7, equation (23), should read $$I_Q = (I_P + I_Q)/ [1+(LI_F/I_G)^5][1+(LI_F/I_G)^4][1+(LI_F/I_G)^3][1+(LI_F/I_G)^2] \quad (23)$$

Column 7, line 67, "$(LI_F/IG)^N$" should read --$(LI_F/I_G)^N$--.

Column 8, line 27, "and" should read --any--.

Column 8, line 60, "$LI_F/I_G = 3$" should read --$LI_F/I_G = 4$--.

Column 9, line 13, delete "a", first two occurrences.

Column 9, line 66, "supplying a second and a third" should read --applying second and third--.

Column 10, line 19, "supplying a second and a third" should read --applying second and third--.

UNITED STATES PATENT OFFICE
CERTIFICATE OF CORRECTION

PATENT NO. : 3,867,685

DATED : February 18, 1975

INVENTOR(S) : Adel Abdel Aziz Ahmed

It is certified that error appears in the above-identified patent and that said Letters Patent are hereby corrected as shown below:

Column 10, line 39, "supplying" should read --applying--.
Column 10, line 41, delete "a" (both occurrences).
Column 11, line 57, delete "a" (all three occurrences).
Column 11, line 60, delete "an" and both occurrences of "a".
Column 11, line 65, delete "an".
Column 11, line 66, delete "a" (both occurrences).
Column 12, line 30, delete "a" (both occurrences).

Signed and Sealed this

*second* Day of *December 1975*

[SEAL]

*Attest:*

RUTH C. MASON
*Attesting Officer*

C. MARSHALL DANN
*Commissioner of Patents and Trademarks*